March 9, 1943. W. H. FURNESS 2,313,140
APPARATUS FOR THE MANUFACTURE OF RAYON
Filed May 1, 1940 8 Sheets-Sheet 1
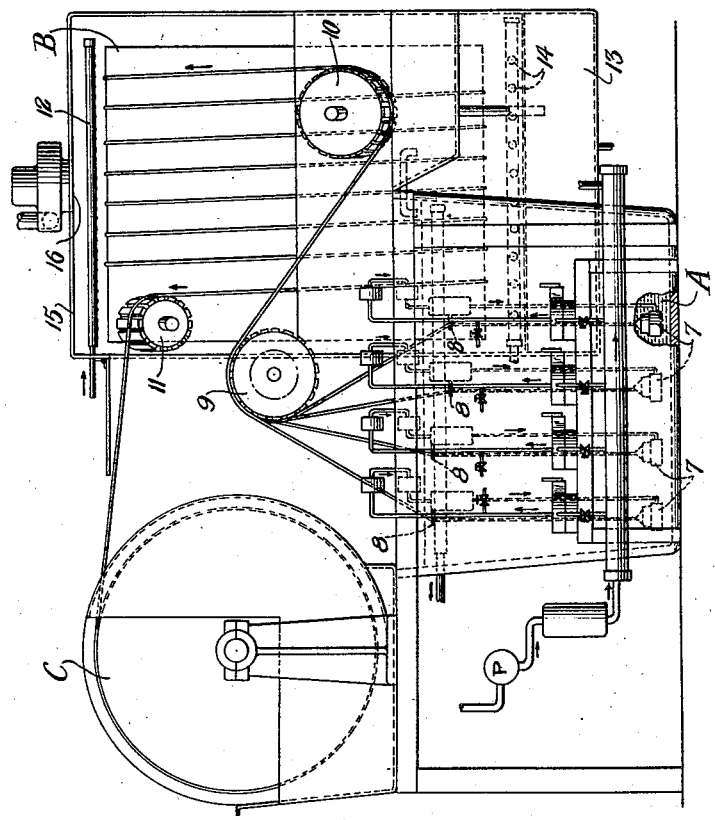
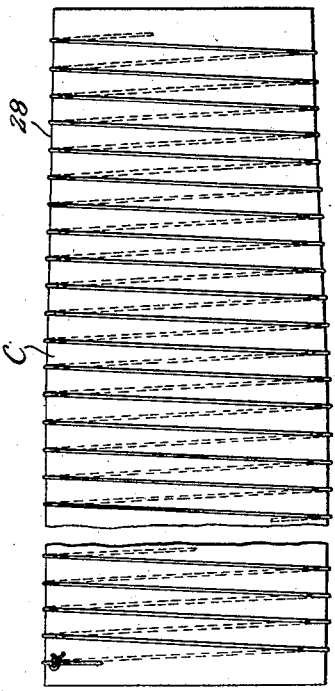
INVENTOR:
William Henry Furness
BY Synnestvedt & Lechner
ATTORNEYS.

March 9, 1943. W. H. FURNESS 2,313,140
APPARATUS FOR THE MANUFACTURE OF RAYON
Filed May 1, 1940 8 Sheets-Sheet 2
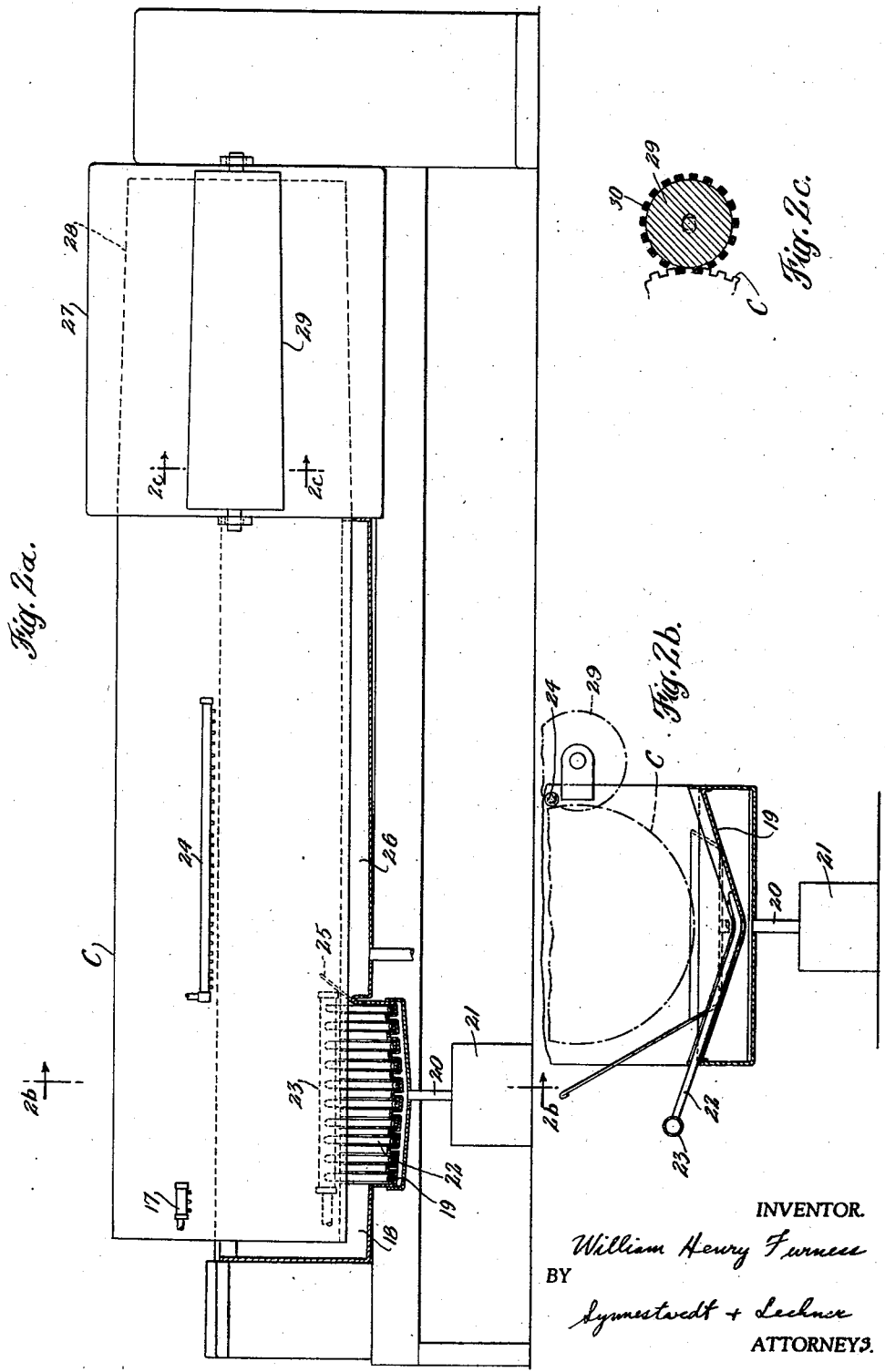
INVENTOR.
William Henry Furness
BY
Synnestvedt + Lechner
ATTORNEYS.

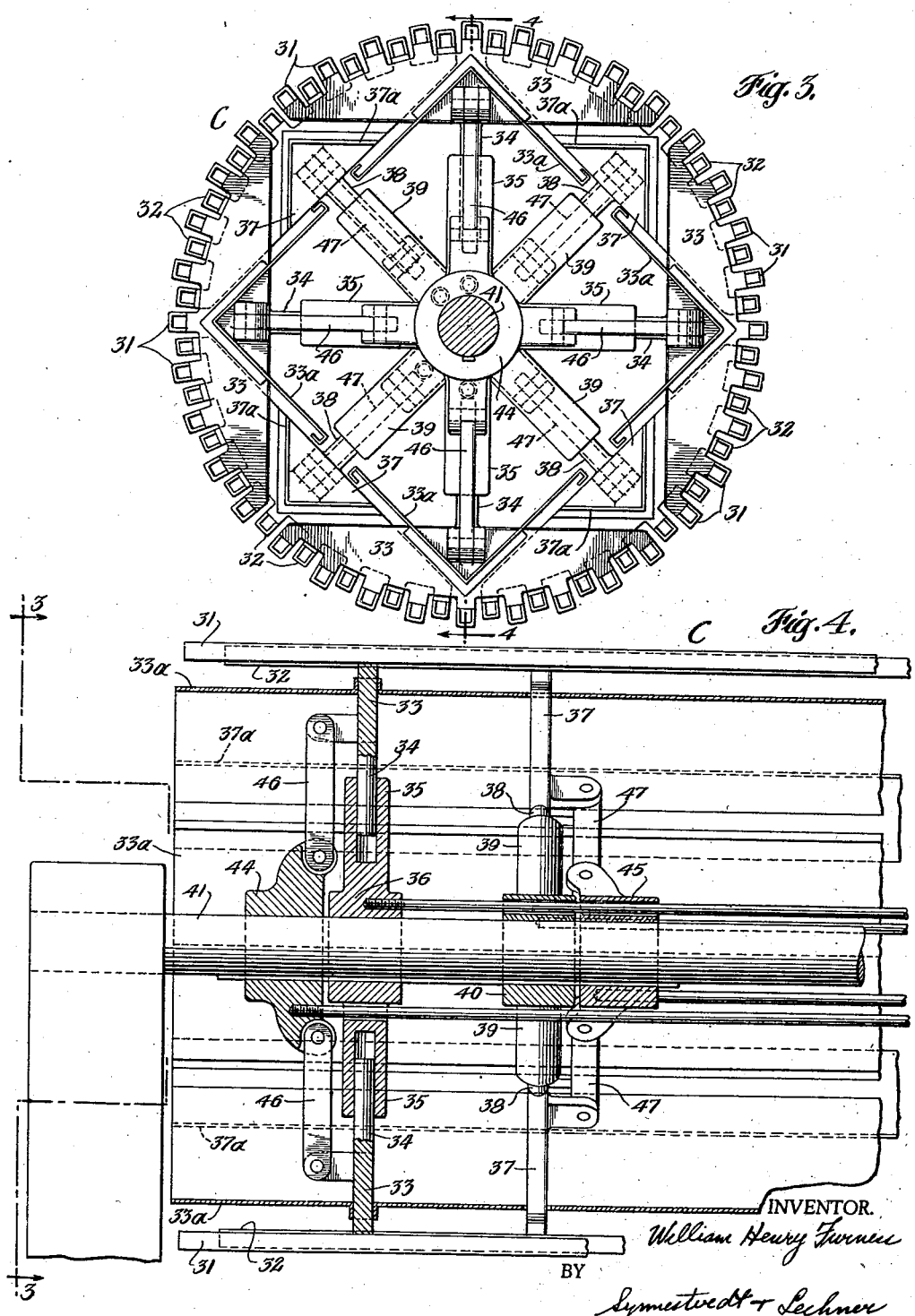

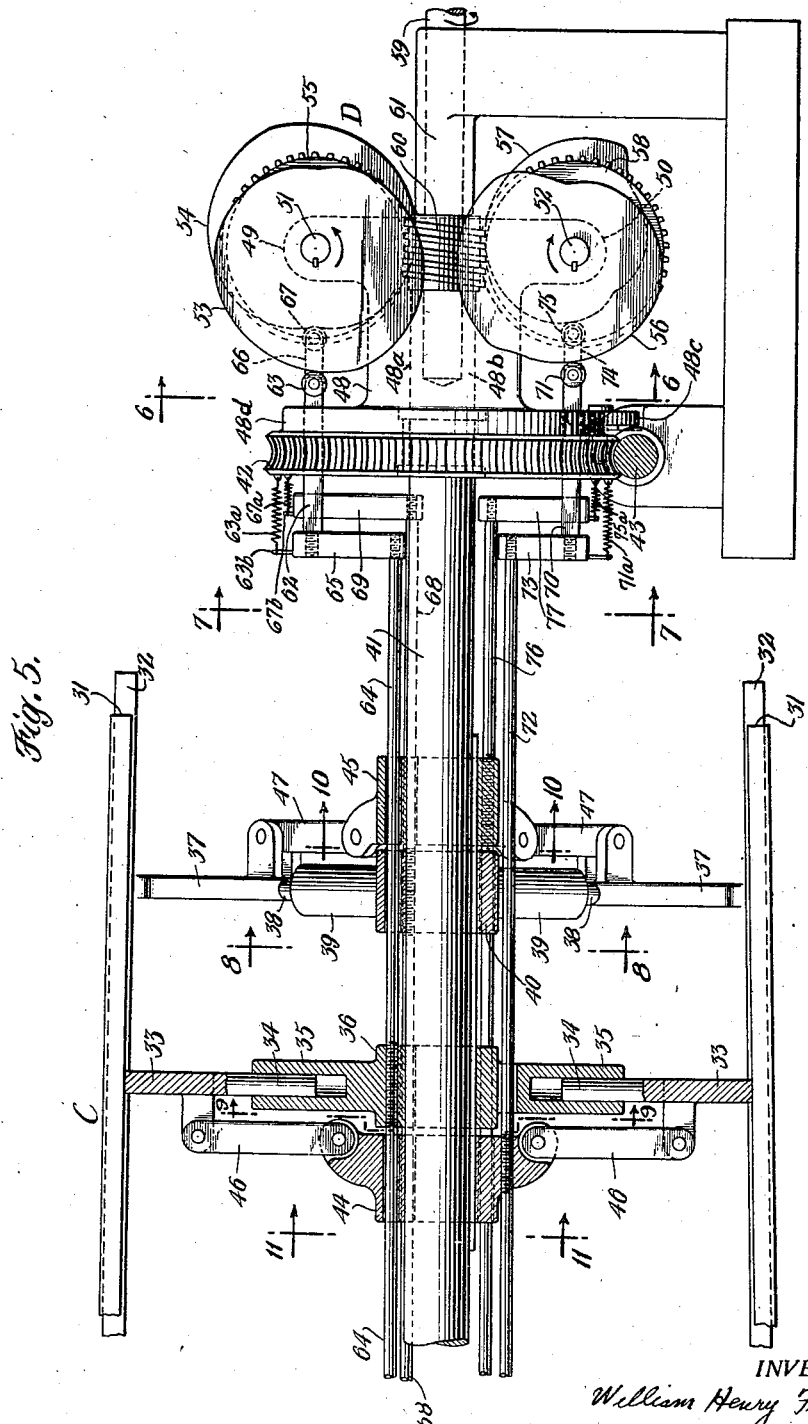

March 9, 1943. W. H. FURNESS 2,313,140
APPARATUS FOR THE MANUFACTURE OF RAYON
Filed May 1, 1940 8 Sheets-Sheet 5
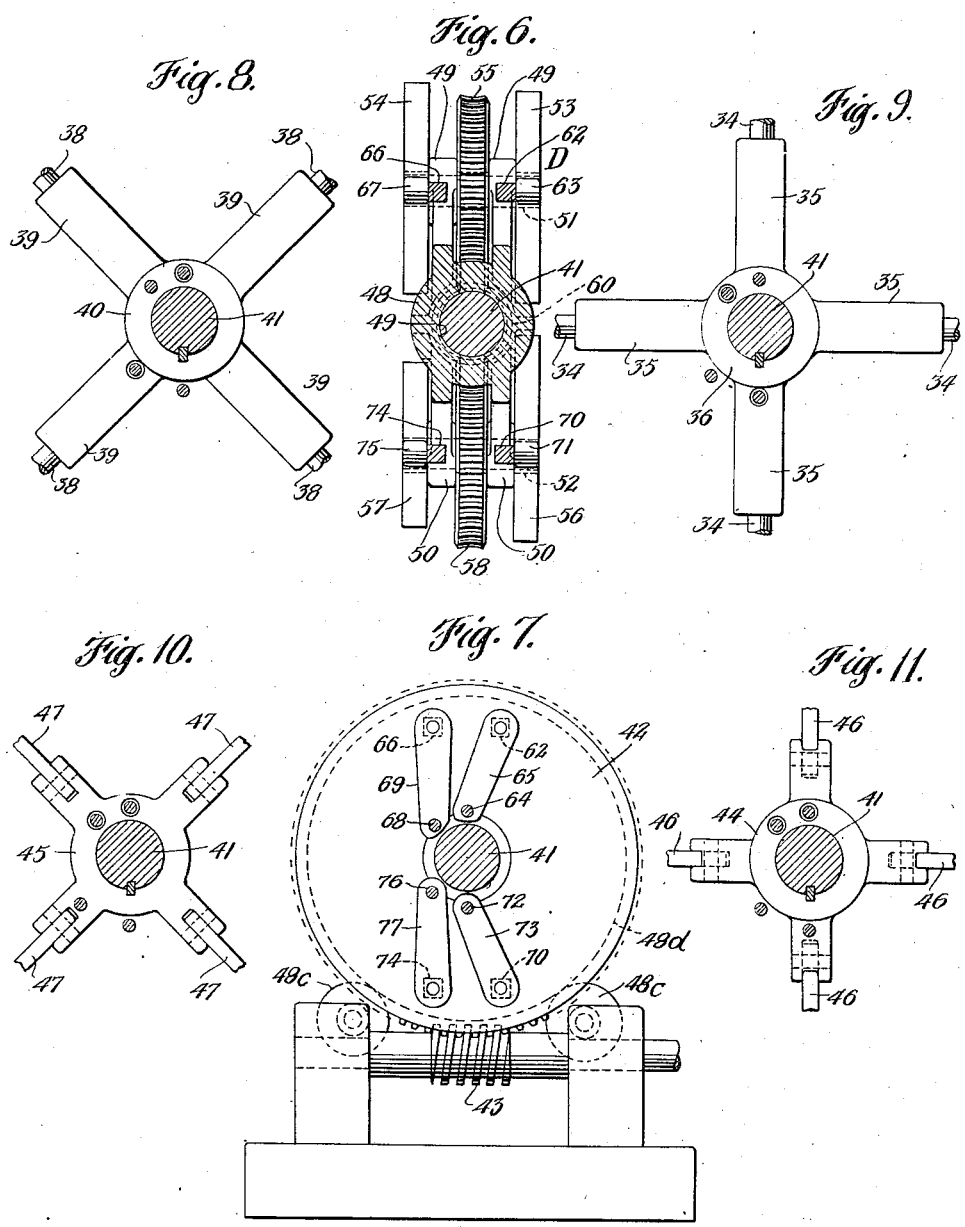
INVENTOR:
William Henry Furness
BY Synnestvedt & Lechner
ATTORNEYS.

March 9, 1943. W. H. FURNESS 2,313,140
APPARATUS FOR THE MANUFACTURE OF RAYON
Filed May 1, 1940   8 Sheets-Sheet 6
 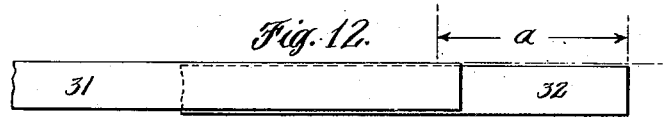
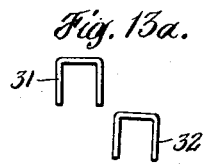 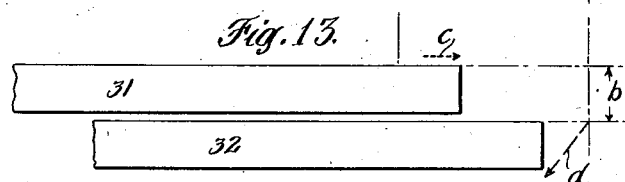
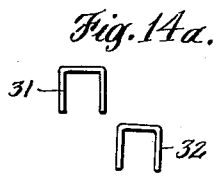 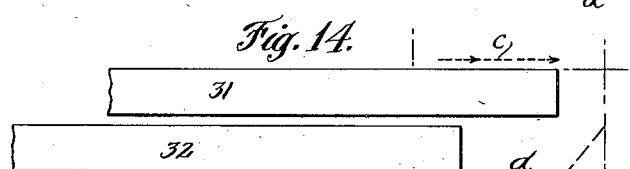
 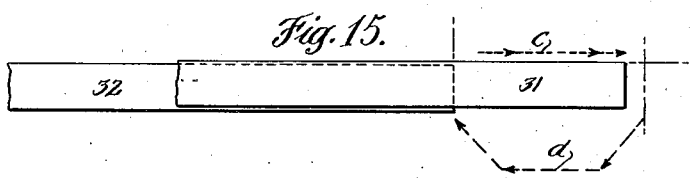
 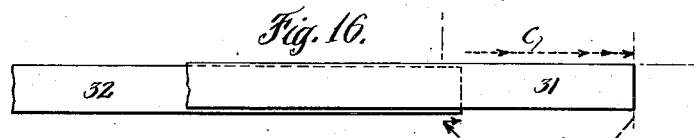
 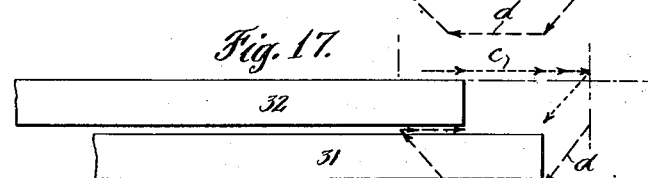
 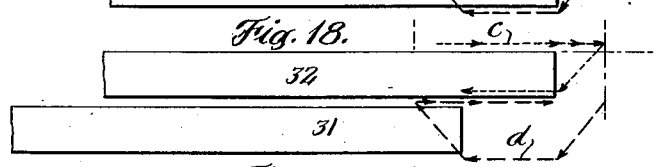
 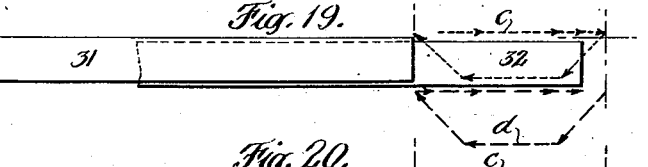
 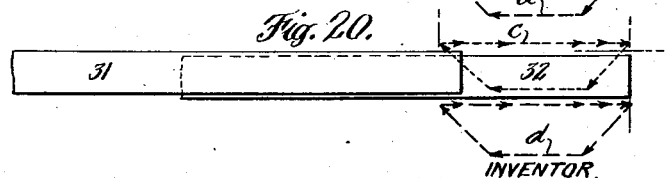
INVENTOR
William Henry Furness
ATTORNEYS
Lynnstvedt + Lechner March 9, 1943.  W. H. FURNESS  2,313,140
APPARATUS FOR THE MANUFACTURE OF RAYON
Filed May 1, 1940  8 Sheets-Sheet 7

INVENTOR:
William Henry Furness
BY
Synnestvedt & Lechner
ATTORNEYS.

March 9, 1943.  W. H. FURNESS  2,313,140
APPARATUS FOR THE MANUFACTURE OF RAYON
Filed May 1, 1940  8 Sheets-Sheet 8

INVENTOR:
William Henry Furness
BY
Synnestvedt & Lechner
ATTORNEYS.

Patented Mar. 9, 1943

2,313,140

UNITED STATES PATENT OFFICE 2,313,140

APPARATUS FOR THE MANUFACTURE OF RAYON

William H. Furness, Haddonfield, N. J., assignor to American Rayon Company, Inc., Riverton, N. J., a corporation of New Jersey Application May 1, 1940, Serial No. 332,693

8 Claims. (Cl. 242—53)

This invention relates to apparatus for the manufacture of rayon, and is particularly useful in the manufacture of cuproammonium rayon. Its nature, objects and advantages will appear from the following description.

The method and apparatus will first be generally described and then the detailed features of construction, reference being had to the accompanying drawings wherein—

Figure 1 is a more or less diagrammatic elevational view of an apparatus for carrying out my invention;

Figure 2 is a broken out diagrammatic elevational view of a cage employed;

Figure 2a is a diagrammatical elevational view of the cage shown in Figure 2 with certain other parts of the apparatus, some of which appear in section, shown associated therewith;

Figure 2b is a fragmentary cross section taken substantially on the line 2b—2b of Figure 2a;

Figure 2c is a fragmentary cross section taken substantially on the line 2c—2c of Figure 2a;

Figure 3 is an enlarged detailed end view of the cage which is diagrammatically shown in Figure 2 taken on the line 3—3 of Figure 4;

Figure 4 is a fragmentary longitudinal section taken substantially on the line 4—4 of Figure 3 and illustrating one end portion of the cage;

Figure 5 is a fragmentary longitudinal section similar to Figure 4 but illustrating the other end portion of the cage and associated operating mechanism;

Figure 6 is a cross section taken on the line 6—6 of Figure 5;

Figure 7 is a cross section taken on the line 7—7 of Figure 5;

Figure 21:
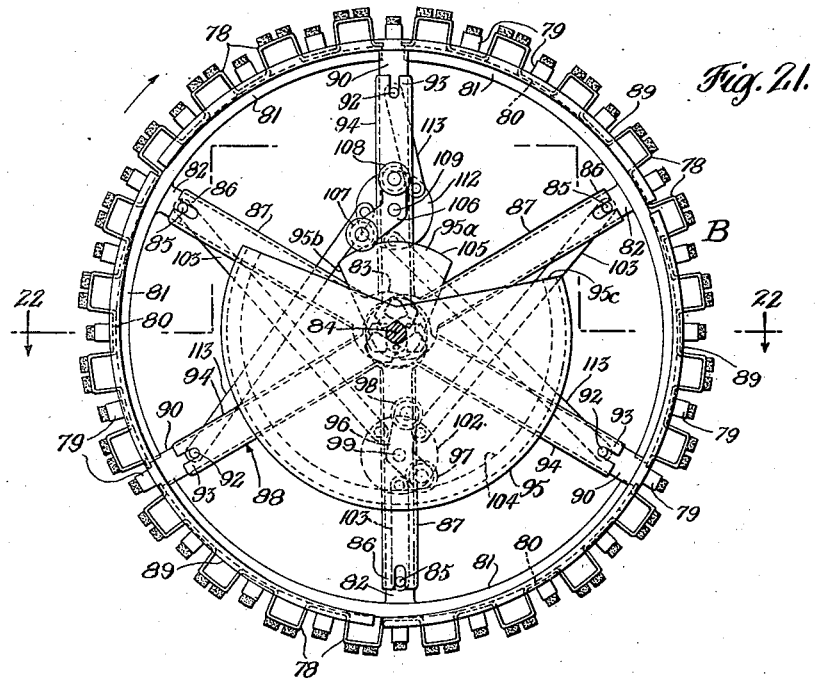
Figure 22:
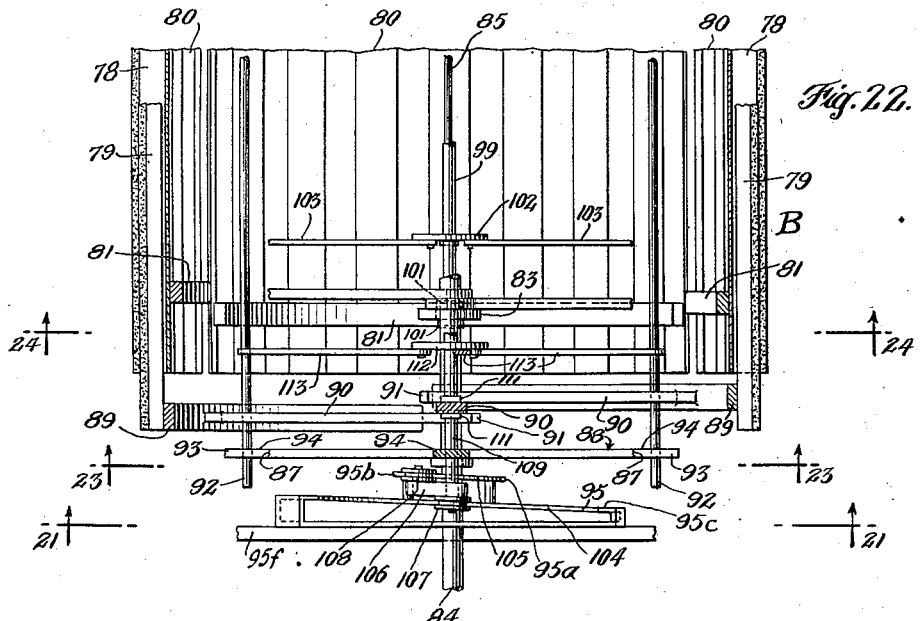
Figure 23:
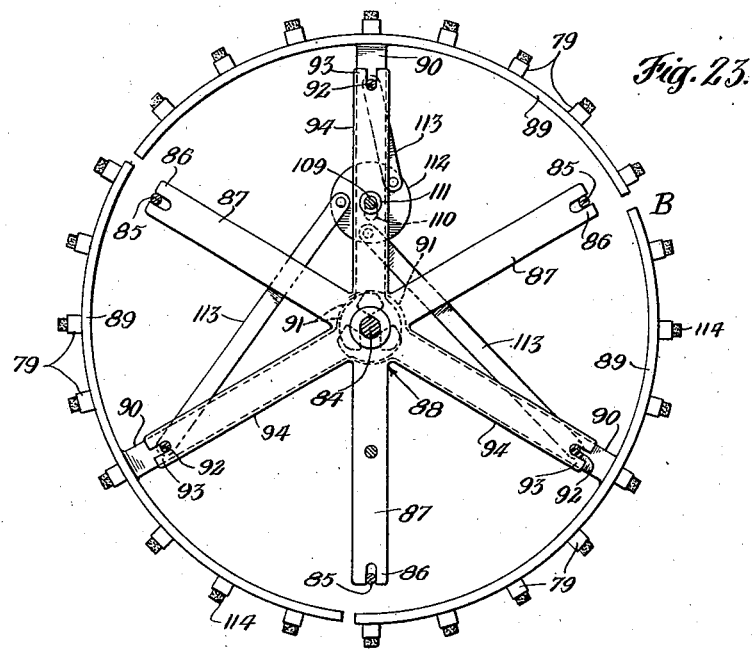
Figure 24:
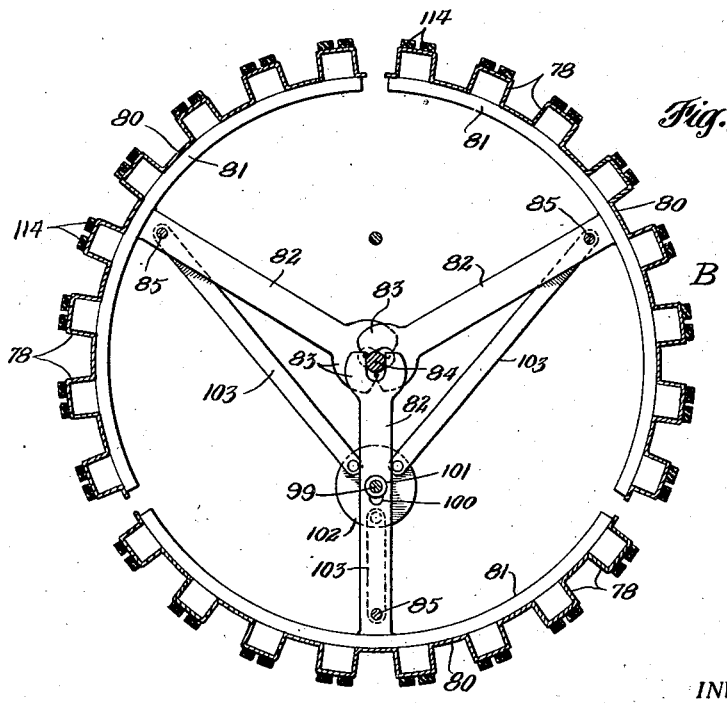

Figures 8, 9, 10 and 11 are fragmentary cross sections taken on the lines 8—8, 9—9, 10—10 and 11—11 respectively of Figure 5;

Figures 12 to 20 inclusive are diagrammatic side views illustrating various positions assumed by the bars of the cage shown in Figures 3 and 4 during one complete cycle of their movements;

Figures 12a to 20a inclusive are diagrammatic end views corresponding to Figures 12 to 20 inclusive;

Figure 21 is an end view taken on the line 21—21 of Figure 22 illustrating another cage employed in the apparatus onto which the thread is laid before it is led to the cage shown in Figure 2;

Figure 22 is a fragmentary longitudinal section taken substantially on the line 22—22 of Figure 21;

Figure 23 is a cross section taken on the line 23—23 of Figure 22 but only illustrating certain of the bars of the cage of Figure 21 and the actuating parts therefor; and Figure 24 is a cross section taken on the line 24—24 of Figure 22 illustrating the remaining bars of the cage and the actuating parts therefor.

The cuproammonium cellulosic spinning solution is preferably made in accordance with my Patent No. 2,225,431, dated December 17, 1940, if wood pulp be employed, and according to my Patent No. 2,247,124, dated June 24, 1941, if cotton linters be employed.

Referring now particularly to Figures 1, 2, 2a, 2b, and 2c, the cellulosic solution is pumped from a suitable source of supply to the spinnerets 7 in the caustic soda setting bath A. The caustic soda setting bath has a concentration of from about 25 to 45 grams per liter of NaOH, depending upon such considerations as the concentration of the cellulose in the spinning solution. The spinnerets preferably discharge upwardly and the setting bath is circulated as described in my copending application Serial No. 332,694, filed May 1, 1940. The number of spinnerets employed varies, dependent upon how heavy a bundle of filaments it is desired to produce and treat. The bundles of filaments delivered by the spinnerets are gathered into a single bundle after passing suitable guides 8, and the bundle is led over a driven roll 9 and thence passed around an idler roll 10 and laid up in the form of a continuously advancing helix on the rotating cylindrical cage B, the construction and operation of which will be later described. From the cage B the bundle of filaments is led over an idler 11 to a similar cylindrical cage C upon which the bundle is laid in the form of a continuously advancing helix, as indicated in Figure 2.

On the rotating cylindrical cage B, the turns of the bundle are subjected to a water wash which is preferably hot. The water wash is introduced by means of a perforated pipe 12, and the water dripping on the upper part of the cage collects in the bottom in a suitable pan 13 in which, located slightly below the normal water line, is a series of nozzled pipes 14 of similar construction to those shown in Figures 2a and 2b, which will be later described. Air is delivered to these pipes and has the effect of blowing up wash liquor against the bottom of the cage. In consequence, the filaments of the bundle are effectively subjected to the hot water wash which has the effect of removing the bulk of the caustic soda, the ammonia and a substantial portion of the copper in the filaments. Hot water is used in preference to cold water, for the reason that caustic soda is more soluble in hot water and therefore the removal of the caustic soda, ammonia and copper can be effected with a smaller quantity of water than would otherwise be required.

The wash liquor collected from beneath the cage contains caustic soda, ammonia, copper, and some sodium sulphate, the chemicals being recovered in the manner shown and described in my copending application Serial No. 332,694, filed May 1, 1940.

Some of the ammonia in the filaments is evaporated as gas by the hot water and in order to collect this, the cage is enclosed in a housing 15 having a suction outlet 16 for carrying off the ammonia gas along with air, for subsequent recovery of the ammonia as ammonia water, as described in my aforesaid copending application.

The bundle of filaments, now largely freed of caustic soda, of the ammonia, and of a substantial part of the copper, is first subjected on the cage C to a sulphuric acid wash solution, the solution being supplied by the perforated pipe 17, as shown in Figure 2a. The acid wash solution runs down over the cage and is collected in the pan 18 and serially flows into a succession of troughs 19 which are downwardly inclined toward the center, crosswise of the cage, and also lengthwise of the cage. The first trough fills, overflows, runs into the next trough which overflows, and so on until the acid reaches the central discharge outlet 20, which discharges into a reservoir 21. In each trough there is a nozzled pipe 22, fed from a manifold 23 with compressed air, so that the acid wash liquor is blown up against the bottom of the cage.

In consequence, the filaments of the bundle are effectively subjected to the acid wash and the remaining caustic soda and copper are removed from the filaments.

By virtue of the fact that most of the caustic soda, the ammonia and a substantial part of the copper have been previously removed by the hot water wash, a relatively small amount of sulphuric acid is required in the acid section. It will also be noted that the fresh acid solution is applied to the beginning of the helix and only for a short distance; and that the acid solution collecting therebeneath is fed in the direction of the advance of the helix so that the strongest solution is applied at the beginning of the helix and, as the solution becomes weaker, it is successively applied to portions of the bundle progressively containing less caustic soda and copper, and this despite the fact that the cage C is horizontally disposed.

The acid and the soluble salts in and on the bundle of filaments are removed by a water wash supplied through the perforated pipe 24. The drippings from the first portion of this pipe are directed by the inclined baffle 25 into the right hand trough of the succession of troughs 19, the collected wash water overflowing into the next trough and so on until the wash liquor discharges through the pipe 20 into the vessel 21, along with the acid wash liquor proper. The purpose of this is to recover acid and copper, it being noted that the filaments leaving the acid section proper contain a substantial amount of acid and some copper. The remaining portion of the wash liquor collecting in the pan 26 contains so little acid and copper that it may be discarded, if desired.

The wash liquors collected in the reservoir 21 are treated in the manner described in my aforesaid copending application.

After the final wash section, the helix is subjected to a drying operation, hot air being supplied to the enclosing casing 27. To permit of shrinkage during the drying, it is preferable to taper the cage at the drying end portion, as indicated at 28.

Referring back to the spinning and the hot water wash treatment, the spinning solution or "goo" is fed to the spinnerets in constant volume, and the roll 9 is driven at constant speed as is the cage B. The roll is driven at a constant speed coordinated with the rate of delivery of the spinnerets, whereby breaking off of the filaments is avoided. It is apparent that the lineal speed of the cage B is greater than the rate of spinning, the result of which is to stretch the bundle of filaments. This stretching is such as would cause breakage at the spinnerets. By interposing the roll 9, which is driven at a constant speed coordinated with the rate of spinning, the greater portion of the stretching occurs between the cage B and the roll 9. One advantage of the foregoing is that loosening of the turns of the helix on the cages is prevented during liquid treatment. The stretching also expresses some liquid from the bundle which is advantageous in such respect. Furthermore, it makes it possible to spin a cellulosic spinning solution of relatively high viscosity. The higher the viscosity of the spinning solution, the more slowly must it be spun into the setting bath and the more slowly must the draw roll be rotated. While, therefore, in such case, the spinning solution is being slowly spun into the setting bath, yardage is gained by the stretching so that the cage B and the cage C can be operated at a sufficiently rapid rate for commercial production.

For some classes of work, the end product might be too low in elongation, because the stretching has the effect of decreasing the elongation property of the filaments. For such classes of work, therefore, it is preferable to provide means whereby the elongation lost during the stretching may be regained in whole or in part. To this end, I provide a ribbed, corrugated roll 29 at the drying end portion of the cage C as diagrammatically indicated in Figure 2a. The ribs or corrugations 30 on the roll 29 fit between the spaces, i. e., interleave with the bars, of the cage C, as shown in Figure 2c. The effect is to crimp the bundle and to spread the filaments somewhat, in consequence of which, as drying proceeds, the bundle of filaments has opportunity for free shrinkage, during which shrinkage, elongation lost during the stretching is regained, the extent of elongation regained being dependent upon the adjustment of the roll 29 toward and away from the cage. In cases where it is unnecessary to regain elongation, the roll 29 is adjusted to an inoperative position. The roll 29 is of course an idler roll and is driven by the cage C. In addition, it is pointed out that the roll 29 is advantageous in that, due to the crimping of the thread, it keeps the thread feeding along at the tapered end of the cage, and also separates the filaments of the thread somewhat to give more effective drying.

It is to be understood that when the bundle is dried, it is continuously drawn off from the drying end of the cage C and laid upon any suitable holder, in the case of long filament rayon. In the case of rayon staple, the bundle may be led onto a conveyor in the usual manner, either before or after drying, and cut into the desired lengths on the conveyor; or it may be cut on the drying end of a cage, as shown in my copending application Serial No. 269,881, filed April 25, 1939. In the case of staple, a very fat bundle will be spun, for which purpose a greater number of spinnerets would be cut in. In the case of long filament rayon, one or more spinnerets may be employed depending upon the denier desired.

Certain features of construction will now be described and followed by a statement of the advantages thereof.

The cage C, which is diagrammatically illustrated in Figures 1, 2, 2a, 2b and 2c and in detail in Figures 3 to 11 inclusive, comprises a multiplicity of bars mounted for radial in and out and longitudinal back and forth movement, the bars being arranged in concentric formation in two sets with the bars 31 of one set in circumferentially evenly spaced interspersed relation with the bars 32 of the other set. The bars of each set are arranged in groups and, in this instance, I have shown each set of bars arranged in four groups, with each group including nine bars. The bars 31 are secured at spaced intervals along their length to arcuate supports 33, having radially disposed rods 34 which slidingly fit the radial spokes 35 of hub members 36. Similarly, the bars 32 are secured at spaced intervals along their length to arcuate supports 37 having radially disposed rods 38 which slidingly fit the radial spokes 39 of hub members 40, it being noted that the hub members 36 and 40 are so relatively disposed that the spokes 35 and 39 are in even alternate radial relation as viewed in Figure 3. In this figure, I have shown the bars 31 in their outermost positions and the bars 32 in their innermost positions for the sake of clarity, while in Figures 4 and 5 the bars 32 as well as the bars 31 are shown in their outermost positions.

The hub members 36 and 40 are splined on a central longitudinal driven shaft 41 so as to rotate therewith and to be adapted for movement longitudinally back and forth on the shaft as will further appear. A worm wheel 42 is keyed on the shaft 41 and is rotated by a worm 43 having driving connection with a suitable source of power.

Collars 44 and 45 splined on the shaft 41 are located adjacent the hub members 36 and 40 respectively, and are adapted to be shifted longitudinally back and forth on the shaft independently of the back and forth movement imparted to the hub members. The collars 44 are connected to the arcuate members 33 by means of links 46 and the collars 45 are connected to the arcuate members 37 by means of links 47 and, therefore, when the collars are moved toward and away from their associated hub members, the connected arcuate members with their bars are moved radially in and out.

Referring particularly to Figures 5 and 6, a cam mechanism indicated as a whole by the reference letter D is illustrated for imparting the radial in and out and longitudinal back and forth movement to the bars above referred to. This cam mechanism comprises a supporting or bearing member 48 secured to the worm wheel 42 to rotate therewith, and having a bore 48a for receiving the end portion 48b of the shaft 41 and transversely extending bearings 49 and 50 for the cam shafts 51 and 52. A pair of cams 53 and 54 and a worm wheel 55 are keyed on the cam shaft 51 for imparting longitudinal back and forth movement to the bars 31 and 32 of the cage in a predetermined timed relation, and a pair of cams 56 and 57 and a worm wheel 58 are keyed on the cam shaft 52 for imparting radial in and out movement to the bars 31 and 32 of the cage in a predetermined timed relation.

The cams referred to are rotated by means of a drive shaft 59 connected to any suitable source of power, and a worm 60 keyed on the shaft and meshing with the worm wheels 55 and 58. The shaft 59 is rotatably mounted in a fixed bearing 61 and in the end portion 48b of the shaft 41.

It is pointed out that since the worm wheel 42 is keyed on the shaft 41 and since the bearing member 48 in which the cam shafts are mounted is secured to this worm wheel, the cam assembly including the cams 53, 54, 56 and 57 and the worm wheels 55 and 58 rotate bodily around the axis of the shaft 41 and the cage. Bearing support is provided at this end of the device by means of circumferential spaced supporting rollers 48c on which the cylindrical portion 48d of the member 48 rides. The drive shaft 59 and worm 60, however, are driven at a different speed from that of the shaft 41 and therefore the cams are rotated on their axes while they are being bodily rotated around the axis of the shaft 41.

The cam 53 is operatively connected to the bars 31 to impart back and forth movement thereto by means of a horizontally disposed bar 62, slidingly mounted in the worm wheel 42 having a roller 63 at one end riding on the cam surface of the cam 53 and having a longitudinally reciprocable rod 64 connected to its other end, by an arm 65. The rod 64 is secured to the hub members 36 which have connection with the bars 31 in the manner above described. The roller 63 is yieldingly maintained in contact with the cam 53 by means of a spring 63a connected at one end to the worm wheel 42 and at its other end to a pin 63b carried by the arm 65.

Similarly the cam 54 is operatively connected to the bars 32 to impart back and forth movement thereto by means of bar 66, roller 67, rod 68 and arm 69, the rod 68 in this case being secured to the hub members 40 of the bars 32. The roller 67 is yieldingly maintained in contact with the cam 54 by means of a spring 67a connected at one end to the worm wheel 42 and at its other end to a pin 67b carried by the arm 69.

The cam 56 is operatively connected to the bars 31 to impart radial in and out movement thereto by means of a horizontally disposed bar 70 slidingly mounted in the worm wheel 42 having a roller 71 at one end riding on the cam surface of the cam 56 and having a longitudinally reciprocable rod 72 connected to its other end by an arm 73. The rod 72 is secured to the collars 44 which have connection with the bars 31 in the manner above described.

Similarly the cam 57 is operatively connected to the bars 32 to impart in and out movement thereto by means of bar 74, roller 75, rod 76 and arm 77, the rod 76 in this case being secured to the collars 45 of the bars 32. Springs 71a and 75a similar to the springs 63a and 67a above described yieldingly maintain the rollers 71 and 75 in contact with the cams 56 and 57.

Referring now to Figures 12 to 20 inclusive and 12a to 20a inclusive, it will be seen that I have therein diagrammatically shown by means of two adjacent bars 31 and 32, a series of views illustrating various relative positions taken by the bars during one cycle of their movements, i. e., during the time that the cams 53, 54, 56 and 57 make one revolution on their axes.

In these views, the dimension indicated at a in Figure 12 represents the length of the back and forth movement of the bars and the dimension b in Figure 13 represents the amount of in and out movement of the bars. The short dotted lines and arrows c indicate the path of the bars 31 and the longer dotted lines and arrows d indicate the path of the bars 32.

In Figures 12 and 20, the bars are shown in the same positions as they appear in Figures 4 and 5. The position illustrated in Figure 12 will be assumed to be the starting point in describing one cycle of movement of the bars. As the cams 53, 54, 56 and 57 rotate in the directions of the arrows indicated in Figure 5 the bars 31 first move to the right while remaining in their outermost positions until they reach the end of their right hand movement shown in Figure 16. While this movement of the bars 31 is taking place, the bars 32 first move to the left and also inwardly to the position shown in Figure 13, then to the left while remaining in their inner positions to the point shown in Figure 14, then to the left and outwardly to the point shown in Figure 15 and then to the right while remaining in their outermost positions to the point shown in Figure 16. It is to be noted that both of the sets of bars 31 and 32 move to the right while in their outermost positions during the portion of the cycle between the positions shown in Figures 15 and 16. This portion of the cycle is preliminary, so to speak, to the support of the thread being transferred from the bars 31, which are just completing their forward stroke, to the bars 32 which are just starting on their forward stroke.

From the position shown in Figure 16, the bars 31 move to the left and inwardly to the point shown in Figure 17, then to the left while remaining in innermost position to the point shown in Figure 18, then to the left and outwardly to the point shown in Figure 19, and then to the right while remaining in outermost position to the point shown in Figure 20. It is to be noted that both sets of bars 31 and 32 move to the right while in their outermost positions during the portion of the cycle between the positions shown in Figures 19 and 20, this being similar to the action taking place between the positions shown in Figures 15 and 16 with the exception that in Figure 15 the bars 32 are in their extreme left hand positions and the bars 31 have not quite reached the end of their right hand movement, while in Figure 19 the bars 31 are in their extreme left hand positions and the bars 32 have not quite reached the end of their right hand movement. In other words, in the position of the bars shown in Figure 15, support of the thread is about to be transferred from the bars 31 to the bars 32 while in the position shown in Figure 19 support of the thread is about to be transferred from the bars 32 back to the bars 31 again.

When the bars are in outermost position and moving to the right they contact the thread on the cage and move it to the right to lay it up in the form of a continuously advancing helix, as shown in Figure 2 and when the bars are in inner position and moving to the left they are out of contact with the thread. The overlap of movement to the right in the outer positions of both sets of bars just referred to avoids any possibility of there being a time in the cycle at which no bars are moving to the right in outer position as would be the case if the bars of one set should start to move in and to the left before the bars of the other set had reached their outermost position and started moving to the right. If this should happen there would be a loosening of the thread on the cage and an interruption in the helical advance of the thread.

With reference to the cams, it is pointed out that the cam surfaces of the cams 53 and 56 are so relatively timed and configured that when the bars 31 are moving to the right in their outermost positions or to the left in their innermost positions, the hub members 36 and the collars 44 are moved axially of the shaft 41 at the same speed, so that there is no relative movement therebetween, and that when the bars are moving inwardly or outwardly there is relative axial movement between the hub members and collars toward or away from each other to cause the links 46 to move the bar carrying arcuate members in or out as the case may be. This is also true with respect to the cams 54 and 57 which actuate the bars 32.

In order to collect liquids which would otherwise drip over certain of the parts of the actuating mechanism above described, I have provided inner shields or troughs 33a and 37a of V-shaped form which are carried by the arcuate supports 33 and 37 respectively and which extend longitudinally of the cage C as shown in Figures 3 and 4.

It is pointed out that the driving mechanism for the cage and the cam actuating mechanism D for the bars, with the exception of the bar supports and reciprocating actuating rods, are located beyond the end of the cage itself out of the region where the thread is being chemically treated where they may be conveniently enclosed in a suitable housing, for ready access.

With reference to the relative speeds of the drive shaft for the worm 43 for rotating the cage and the drive shaft 59 for rotating the cams of the cam mechanism D, these may be varied to suit particular conditions. For example, when employing a cage of large diameter rotating at slow speed, these drive shafts may be driven at such relative speeds that the cage will make one revolution for each forward stroke of the bars. When employing a cage of smaller diameter and higher rotative speed, these shafts may be driven at such relative speeds that the cage will make several revolutions for each forward stroke of the bars as is the case in the machine illustrated in the drawings. Thus high speed spinning may be accomplished without rapid shuttling action of the bars. Thus wear of the parts is minimized.

It is to be observed that a cage mechanism constructed in accordance with my invention employs considerably fewer ports than previous mechanisms and that because of its construction very strong and rigid cages of very large size may be provided.

Referring now to the cage B which is diagrammatically illustrated in Figure 1 and in detail in Figures 21 to 24 inclusive, it will be seen from inspection of Figure 1 that the bundle of filaments or thread is laid up on this cage in the form of a continuously advancing helix just as it is laid up on the cage C, the construction of the bars and the actuating mechanism therefor however being of different construction, as will now appear.

The cage in this instance is comprised of two sets of bars arranged in cylindrical formation with the bars 78 of one set in circumferentially evenly spaced interspersed relation with the bars 79 of the other set. The bars of each set are arranged in concentric groups. In this instance I have shown each set of bars arranged into three groups with each group including eight bars.

The bars 78 are in the form of outstanding longitudinally extending ribs provided on the arcuate members 80 which are secured to arcuate supports 81. Each arcuate support has an inwardly extending radial arm 82 provided at its inner or free end with a forked portion 83 which straddles a central longitudinally extending drive shaft 84. Each of the radial arms 82 carries a longitudinally extending rod 85 at a point adjacent its arcuate support 81. These rods 85 fit the bifurcated ends 86 of the spokes 87 of a spoked driving member 88 which is secured to the drive shaft 84 to rotate therewith, and it will be seen, therefore, that when the spoked driving member 88 is rotated the arcuate members 80 are also rotated.

The bars 79 of the other set are secured to arcuate supports 89 each having an inwardly extending radial arm 90 provided at its inner or free end with a forked portion 91 which straddles the drive shaft 84. Each arm 90 carries a longitudinally extending rod 92 at a point adjacent its arcuate support 89. These rods 92 fit the bifurcated ends 93 of the spokes 94 of the spoked driving member 88 above referred to. Thus the rods 92 rotate with the driving member 88 and since these rods are carried by the arms of the arcuate supports 89 it will be seen that the bars 79 rotate with the driving member 88.

Longitudinal back and forth and radial in and out movements are imparted to the bars 78 and 79 by means of a pair of stationary cams 95 and 95a and associated actuating mechanism now to be described. The cams 95 and 95a are fixedly secured to a suitable fixed support such as the frame member shown at 95f in Fig. 22.

The actuating mechanism for actuating the bars 78 comprises a rocker arm 96 carrying grooved cam rollers 97 and 98, and secured on a rock shaft 99. The rock shaft 99 is mounted in one of the spokes 87 of the spoked driving member 88 with freedom for turning movement and also for back and forth longitudinal movement and extends through a slot 100 in the arm 82 of one of the arcuate supports 81 for the bars 78, said arm 82 being aligned with the spoke 87 which carries the rock shaft 99, as shown in Figure 21. The rock shaft 99 is provided with fixed collars 101, 101 abutting against the sides of said arm 82 so that when the rock shaft is shifted in an axial direction the bars will move therewith in a longitudinal direction. The rock shaft 99 has a disc 102 secured thereon which is provided with three circumferentially spaced pins for receiving one end of the links 103. The other ends of these links are connected to the rods 85 above referred to. It will thus be seen that when the rock shaft 99 is rocked the disc moves therewith and causes radial in and out movement of the bars 78 through the medium of the links 103.

Rocking movement is imparted to the rock shaft 99 by means of the rollers 97 and 98 and the surfaces 104 and 105 of the cams 95 and 95a, it being noted that while the roller is riding on the surface 104 of the cam 95 the parts are in the position shown in Figure 21 in which the bars 78 are in their outermost position. When the drive shaft 84 rotates to the point where the roller 97 rides off the surface 104 the roller 98 engages the surface 95b of the cam 95a, and as rotation continues the roller rides onto the surface 105 of the cam 95a, thus causing the rock shaft 99 to rock. This oscillates the disc 102 and operates the links 103 to pull the bars 78 into their inner position. When the shaft 84 rotates to the point where the roller 98 rides off the surface 105 the roller 97 engages the surface 95c of the cam 95 and as rotation continues the roller 97 rides onto the surface 104 of the cam 95 thus rocking the rock shaft back to the position shown in Figure 21 and moving the bars 79 outwardly again.

It is pointed out that the cams 95 and 95a are disposed at an angle as viewed in Figure 22 and therefore as the grooved rollers travel around the cams they are also moved longitudinally back and forth because of the inclined disposition of the cams. Thus the rock shaft 99, the disc 102, the links 103, the arcuate supports 81 and the bars 78 are accordingly moved longitudinally back and forth, the movement in one direction being imparted by the cam 95 and in the opposite direction by the cam 95a. The cam surfaces are so calculated and related that the movement imparted to the bars is similar to the movement above described in connection with the bars of the cage C.

The actuating mechanism for the bars 79 is similar to the actuating mechanism for the bars 78 just described, and comprises a rocker arm 106 carrying grooved cam rollers 107 and 108, a rock shaft 109 carried by one of the spokes 94 of the member 88 and extending through a slot 110 in the arm 90 of one of the arcuate supports 89 for the bars 79, the collars 111 on the rock shaft abutting against the sides of the arm 90, a disc 112 secured on the rock shaft, and links 113 connecting the disc 112 to the rods 92 above described. Since the actuating mechanism operates the same as the actuating mechanism for the bars 78 its operation will be understood from the above.

It is pointed out that in Figures 21 to 24 I have only shown the supports and actuating connection which are located at one end portion of the cage, but it is to be understood that similar parts are employed at the other end portion of the cage and at intermediate points along the cage.

The bars 78 and 79 are provided with facings 114 of material such as sponge rubber for the purpose of preventing copper hydroxide from caking on the faces of the bars as would be the case if metal facings were employed. Preferably the supporting faces of the sponge rubber are made substantially impervious. In this connection it is pointed out that with metal facings the deposit of copper hydroxide is packed onto the bars by the thread, the crystals growing in size and adhering to one another in very hard scaly form, until a cake of such objectionable thickness builds up that the laying up of the thread on the cage is impaired. Also difficulties are experienced in attempting to remove the caked copper hydroxide by mechanical means. The sponge rubber facings prevent the above because of the yieldable character thereof which causes the surface on which the thread is laid to be continuously flexed by the thread due to its tension. With the surface flexing in this manner the precipitated copper is kept in motion and therefore will not form into a cake because the growth of the crystals is prevented as well as their adhesion, one to another, so that they may be compared with very loose snow flakes which either fall off by their own weight or are removed by the washing liquids. On the other hand, on a plain metallic surface the crystals tend to pack like snow would pack into ice-like form. The rollers 9, 10 and 11, above referred to, are also provided with such sponge rubber facings.

It is to be understood that while I have employed bar actuating mechanism for the cage B of different form from the bar actuating mechanism for the cage C, I contemplate employing actuating mechanism of either of these forms for both cages.

I claim:

1. Apparatus for laying up thread in the form of a continuously advancing helix, comprising a rotating cage-like thread carrying cylinder; said cylinder comprising two concentric sets of circumferentially spaced longitudinally extending bars, the bars of one set being in interspersed relation to the bars of the other set; means connecting the bars of each set into a plurality of units each comprising a plurality of bars, radially disposed members carried by said connecting means; actuating mechanism for imparting back and forth longitudinal movement and in and out radial movement to the bar units of each set independently; and means connecting said actuating mechanism to said radially disposed members.

2. Apparatus for laying up thread in the form of a continuously advancing helix, comprising a rotating cage-like thread carrying cylinder; means for guiding thread onto said cylinder adjacent one end thereof; said cylinder comprising two sets of circumferentially spaced longitudinally extending bars, with the bars of one set interspersed with those of the other set; a plurality of arcuate supports for the bars of each set dividing the sets into a plurality of groups of bars; radially inwardly extending arms carried by said arcuate supports; a central drive shaft extending longitudinally of said cylinder; a plurality of spoked supporting members splined on said shaft, the spokes of which receive said radial arms with capacity for radial in and out movement; a plurality of collars splined on said shaft in association with said spoked members; links connecting said collars to said radial arms, means for moving said spoked members back and forth on said shaft; and means for moving said collars back and forth on said shaft; said spoked members when so moved transmitting longitudinal back and forth movement to the bars and said collars when so moved transmitting radial in and out movement to the bars.

3. Apparatus for laying up thread in the form of a continuously advancing helix, comprising a rotating cage-like thread carrying cylinder; means for guiding thread onto said cylinder adjacent one end thereof; said cylinder comprising two sets of circumferentially spaced longitudinally extending bars, with the bars of one set interspersed with those of the other set; a plurality of arcuate supports for the bars of each set dividing the sets into a plurality of groups of bars; radially inwardly extending arms carried by said arcuate supports; a central drive shaft extending longitudinally of said cylinder; a plurality of spoked supporting members splined on said shaft, the spokes of which receive said radial arms with capacity for radial in and out movement; a plurality of collars splined on said shaft in association with said spoked members; links connecting said collars to said radial arms; drive means for rotating said drive shaft; rotatable cams for moving said spoked members back and forth on said shaft; rotatable cams for moving said collars back and forth on said shaft; drive means for rotating said cams, said drive means being independent of the drive means for the drive shaft; and a support for said rotatable cams mounted for rotation with said drive shaft.

4. Apparatus for laying up thread in the form of a continuously advancing helix, comprising a rotating cage-like thread carrying cylinder; means for guiding thread onto said cylinder adjacent one end thereof; said cylinder comprising two sets of circumferentially spaced longitudinally extending bars, with the bars of one set interspersed with those of the other set; a plurality of arcuate supports for the bars of each set dividing the sets into a plurality of groups of bars; radially inwardly extending arms carried by said arcuate supports; a central drive shaft extending longitudinally of said cylinder; a plurality of spoked supporting members splined on said shaft, the spokes of which receive said radial arms with capacity for radial in and out movement; a plurality of collars splined on said shaft in association with said spoked members; links connecting said collars to said radial arms; drive means for rotating said drive shaft including a worm wheel secured on the drive shaft and a driving worm for said worm wheel; a supporting member mounted coaxially with said drive shaft for rotation therewith; rotatable cams and associated actuating means for imparting back and forth movement to said spoked members; rotatable cams and associated actuating means for imparting back and forth movement to said collars; worm wheels rotatable with said cams; transverse bearings carried by said supporting member for said cams and worm wheels; and a driving worm for said cam worm wheels mounted coaxially with said drive shaft for rotation independently thereof.

5. Apparatus for laying up thread in the form of a continuously advancing helix, comprising a rotating cage-like thread carrying cylinder; fixed means for guiding thread onto said cylinder adjacent one end thereof; said cylinder comprising two sets of circumferentially spaced longitudinally extending bars, with the bars of one set interspersed with those of the other set; means associated with each set for imparting movement thereto in directions back and forth longitudinally of the cylinder comprising a rotatable cam, a member reciprocated by said cam, and means for connecting said member and the set of bars for reciprocation together; other means associated with each set for imparting movement thereto in directions inwardly and outwardly of said cylinder, comprising a rotatable cam, a member reciprocated by said rotatable cam, linkage means connecting said last mentioned member and the set of bars for converting the reciprocating movement of said last mentioned member to the set of bars as movement inwardly and outwardly of the cylinder; and means for rotating said cams.

6. Apparatus for laying up thread in the form of a continuously moving helix, comprising a rotating cage-like thread carrying cylinder; fixed means for guiding thread on said cylinder adjacent one end thereof; a pair of independently movable sets of longitudinally extending bars, the bars of said sets being arranged in interspersed and spaced relation to constitute said thread carrying cylinder; cam mechanism for each set adapted to impart in and out and back and forth longitudinal movement thereto, the cam mechanism of each set comprising a rotatable cam adapted to impart said in and out movement, a rotatable cam adapted to impart said back and forth movement, a reciprocating member contacting the cam surface of said first mentioned cam, a reciprocating member contacting the cam surface of said second mentioned cam, a supporting member for said set of bars, said supporting member being connected to said second mentioned reciprocating member for reciprocation thereby, a collar mounted in adjacent spaced relation to said supporting member, said collar being connected to said first mentioned reciprocating member for reciprocation thereby, linkage means connecting said collar to said set of bars to impart in and out movement thereto when the collar is reciprocated back and forth, and means for effecting rotation of said cams; the cam mechanism of said two sets of bars being so relatively set that during one revolution of the cams one of the sets moves out and then starts forwardly in the direction of advance of the helix just prior to the time that the other set reaches the end of its forward stroke, that said first mentioned set then continues in forward stroke while the second mentioned set moves in, on its backward stroke, and then out again, and that said second mentioned set then starts forwardly just prior to the time that said first mentioned set reaches the end of its forward stroke, and so on whereby an uninterrupted continuously advancing helix is laid on the cylinder.

7. Apparatus for laying up thread in the form of a continuously advancing helix, comprising a rotating cage-like thread carrying cylinder; fixed means for guiding thread onto said cylinder adjacent one end thereof; said cylinder comprising two sets of circumferentially spaced longitudinally extending bars, with the bars of one set interspersed with those of the other set; means associated with each set for imparting movement thereto in directions back and forth longitudinally of the cylinder comprising cam means, a member reciprocated by said cam, and means connecting said member and the set of bars for reciprocation together; and means associated with each set for imparting movement thereto in directions inwardly and outwardly of said cylinder, comprising the aforesaid cam means, a rock shaft having a member engaging said cam means to effect rocking movement of the rock shaft, and means connecting said rock shaft to the set of bars to move it inwardly and outwardly.

8. Apparatus for laying up thread in the form of a continuously advancing helix, comprising a rotating cage-like thread carrying cylinder; fixed means for guiding thread onto said cylinder adjacent one end thereof; said cylinder comprising two sets of circumferentially spaced longitudinally extending bars, with the bars of one set interspersed with those of the other set; means associated with each set for imparting movement thereto in directions back and forth longitudinally of the cylinder comprising stationary cam means, a member reciprocated by said cam means when the cylinder is rotating, and means for connecting said member and the set of bars for reciprocation together; means associated with each set for imparting movement thereto in directions inwardly and outwardly of said cylinder, comprising said cam means and linkage operable thereby when the cylinder is rotating and connected to the set of bars; a fixed support for said cam means; and means for rotating said cylinder.

WILLIAM H. FURNESS.